UNITED STATES PATENT OFFICE.

ERICH OPPERMANN, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PROCESS OF TREATING ORGANIC SUBSTANCES IN PRESENCE OF VANADIUM COMPOUNDS.

No. 823,435.  Specification of Letters Patent.  Patented June 12, 1906.

Application filed August 31, 1904. Serial No. 222,837.

*To all whom it may concern:*

Be it known that I, ERICH OPPERMANN, Ph. D., chemist, a citizen of the Empire of Germany, residing at Höchst-on-the-Main, Germany, have invented certain new and useful Improvements in the Process of Treating Organic Substances by Electrolysis in Presence of Vanadium Compounds, of which the following is a specification.

It is known that the higher oxids of vanadium are excellent oxidizing agents, (*Dammer*, III, 702,) yet only little practical use has hitherto been made of this property—as, for instance, in the manufacture of fuchsin according to Schmid Baldenspenger (*Moniteur Scientifique*, 1879)—in color-printing and the manufacture of anilin-black. In all cases, however, vanadium serves as a catalytic agent of oxygen.

The easy oxidability of the lower oxids of vanadium has also been studied; but this energetic reducing power has hardly been used hitherto. The reasons for this limited application of so excellent an oxidizing or reducing agent are partly to be found in the comparatively high price of vanadium salts and partly in the inconvenience and expense of regeneration when merely chemically employed. It would have been impossible under these circumstances to use a substance almost unequalled in its various applications. This inconvenience is avoided by the present process.

I have found that vanadium compounds in an electrolytic bath are excellent depolarizers both at the anode and cathode. The rapidity of carrying oxygen and hydrogen to the acceptors being very great, (indigo is reduced instantaneously and one part of vanadium salt oxidizes one thousand parts of anilin to anilin-black in presence of oxidizing agents,) only small quantities of vanadium salts need be used for reducing or oxidizing by electrolysis. By this favorable combination (not to be foreseen) of the hitherto unused advantages of vanadium as oxidizing or reducing agent and the application of electrolytic oxygen and hydrogen I found an excellent process for oxidizing and reducing inorganic and organic substances in an electrolytic bath. No special (organic) solvents need be employed; neither is a diaphragm requisite, as in the process of German Patent No. 117,129, dated April 10, 1899. Compared with other activating agents—such, for instance, as chromates and manganates—the various oxids of vanadium are of advantage in this process, for to every degree of oxidation of vanadium belongs a certain reducing or oxidizing potential—that is to say, the various oxids of vanadium produced in the electrolytic bath have a more or less strong reducing or oxidizing power on inorganic or organic substances introduced into the solution. Thus it is apparent from Example III that azobenzene is reduced to benzidin by means of electrolytic hydrogen in presence of $V_2O_3$. On the other hand indigo is reduced by the highest reducing potential of $V_2O_2$. The higher oxidized vanadium compounds ($V_2O_4$ or $V_2O_5$) may be used for oxidizing purposes, yet the reduction of sulfuric acid to $SO_2$ by means of $V_2O_4$ in a hot concentrated sulfate solution is also an example of the reducing power of this oxid, (*Z. f. Anorg. Chemie*, 35, 156.) The excellent oxidizing power of the highest vanadium oxids ($V_2O_5$) is shown in Example I. A practical application of this property has already been made in German Patent No. 128,616, dated March 22, 1900, relating to the process of manufacturing sulfuric anhydrid by de Haen.

*Example I.—Oxidation of anthracene.*— Into a vessel lined with lead, serving as anode, is introduced sulfuric acid of twenty-per-cent. strength as electrolyte with a quantity of vanadic acid dissolved therein—for instance, one per cent. Lead, for instance, may be used as cathode. The anthracene to be oxidized is introduced into the vessel as a fine powder while actively stirring, and the mixture is heated to about 80° centigrade. With a current density of three hundred amperes per square meter the tension is 1.6 volts. After a short time anthraquinone may be proved. If a somewhat greater current quantity than the theoretical one has passed the electrolyte, the anthraquinone need only be filtered, and the electrolyte may be used for another operation.

*Example II.—Oxidation of anilin to quinone, (hydroquinone.)*—In German Patent No. 117,129 a process for producing quinone from anilin has been described; but it specially refers to the use of a diaphragm. Besides the advantage of operating without a diaphragm I have found that by adding vanadic acid apart from oxidizing anilin to quinone a reduction of the formed quinone to hydroquinone occurred by means of vanadium. The process is conducted in the same apparatus as in Example I. As electrolyte sulfuric acid of twenty-per-cent. strength is used with an addition of two per cent. of vanadic acid, the process is best carried out at a temperature not exceeding 10° centigrade. With a current density of four hundred amperes per square meter the tension is 3.6 volts. The hydroquinone is isolated in the usual manner.

*Example III.—Reduction of azobenzene.—* Into a vessel lined with lead and serving as cathode is introduced sulfuric acid of twenty-per-cent. strength, two per cent. of vanadium urioxid being dissolved therein. Platinum, for instance, may be used as anode. Into the electrolyte heated to 50° centigrade is introduced while stirring finely-pulverized azobenzene. The electrolysis is conducted with a current density of one to two hundred amperes, and on the completion of the process the benzidin sulfate is filtered.

*Example IV.—Reduction of azoxybenzene.—* Into the cathode-compartment of an electrolytic cell divided by a diaphragm is introduced hydrochloric acid of fifteen-per-cent. strength, serving as electrolyte, with a quantity of vanadic acid dissolved therein—for instance, one per cent. carbon being used as cathode. In the hydrochloric acid heated to 50° centigrade azoxybenzene is suspended and stirred by means of an agitator. The anode-compartment contains, for instance, a saturated solution of common salt, carbon being likewise used as electrode. With a current density of three to four hundred amperes per square meter the tension is about three volts. The completion of the electrolysis occurs with a small excess of current quantity requisite for reducing azoxy-benzene to hydrazo-benzene. When cold, the solution of the separated benzidin chlorid is filtered. The solubility of the benzidin chlorid having been greatly minimized by the hydrochloric acid of fifteen-per-cent. strength, it is preferable to leave the small quantity of benzidin chlorid dissolved, for the electrolyte may be used for another operation.

The electrodes may be arranged in the usual manner. It is therefore preferable and in the nature of this process to choose when operating without a diaphragm a large active electrode in proportion to that of the other pole.

Having now described my invention, what I claim is—

The herein-described process for treating organic substances, which consists in subjecting the same to electrolysis in an acid-bath in the presence of vanadium compounds.

In testimony that I claim the foregoing as my invention I have signed my name in presence of two subscribing witnesses.

ERICH OPPERMANN.

Witnesses:
ALFRED BRISBOIS,
JOHANN HORTENSTEIN.